(12) United States Patent
Hayashi (10) Patent No.: US 7,823,888 B2
(45) Date of Patent: Nov. 2, 2010

(54) GASKET

(75) Inventor: Eizo Hayashi, Miyaki-gun (JP)

(73) Assignee: NOK Corporation, Tokyo (JP)

( * ) Notice: Subject to any disclaimer, the term of this patent is extended or adjusted under 35 U.S.C. 154(b) by 124 days.

(21) Appl. No.: 11/988,483

(22) PCT Filed: Jul. 5, 2006

(86) PCT No.: PCT/JP2006/313399

§ 371 (c)(1), (2), (4) Date: Jan. 7, 2008

(87) PCT Pub. No.: WO2007/007611

PCT Pub. Date: Jan. 18, 2007

(65) Prior Publication Data

US 2009/0085306 A1    Apr. 2, 2009

(30) Foreign Application Priority Data

Jul. 7, 2005    (JP)    ............... 2005-198669

(51) Int. Cl.
*F16J 15/02*    (2006.01)
(52) U.S. Cl. .............. 277/644; 277/648; 277/649; 277/630
(58) Field of Classification Search .............. 277/589, 277/626, 644, 648, 649, 630, 641
See application file for complete search history.

(56) References Cited

U.S. PATENT DOCUMENTS

| | | | | |
|---|---|---|---|---|
| 3,163,431 A | * | 12/1964 | Tanner | 277/381 |
| 3,671,046 A | * | 6/1972 | Hagmann | 277/641 |
| 4,640,455 A | * | 2/1987 | Grein et al. | 228/176 |
| 4,825,015 A | * | 4/1989 | Prott et al. | 174/367 |
| 5,002,290 A | * | 3/1991 | Pernin | 277/649 |
| 5,076,557 A | * | 12/1991 | Beatenbough et al. | 277/312 |
| 5,551,705 A | * | 9/1996 | Chen et al. | 277/648 |
| 5,954,343 A | * | 9/1999 | Sumida et al. | 277/434 |
| 6,322,087 B1 | * | 11/2001 | Swensen et al. | 277/626 |
| 6,354,601 B1 | * | 3/2002 | Krampotich et al. | 277/628 |
| 6,460,859 B1 | * | 10/2002 | Hammi et al. | 277/596 |
| 6,523,833 B1 | * | 2/2003 | Ishigaki et al. | 277/650 |
| 6,722,660 B2 | * | 4/2004 | Gernand et al. | 277/591 |
| 6,981,704 B2 | * | 1/2006 | Okazaki et al. | 277/638 |
| 7,004,478 B2 | * | 2/2006 | Spence et al. | 277/644 |
| 7,128,323 B2 | * | 10/2006 | Iguchi et al. | 277/644 |
| 7,316,402 B2 | * | 1/2008 | Paauwe | 277/641 |
| 2002/0140184 A1 | * | 10/2002 | Janoff et al. | 277/644 |
| 2004/0000763 A1 | * | 1/2004 | Gernand et al. | 277/630 |

FOREIGN PATENT DOCUMENTS

| | | |
|---|---|---|
| JP | 06-065662 U | 9/1994 |
| JP | 08-303599 | 11/1996 |
| JP | 2005-16621 A | 1/2005 |

* cited by examiner

*Primary Examiner*—Alison K Pickard
(74) *Attorney, Agent, or Firm*—Harness, Dickey & Pierce, P.L.C.

(57) ABSTRACT

A gasket having a cross sectional shape longer than it is wide and is prevented from falling over and buckling. The gasket is installed in an installation groove formed in either of two opposite surfaces and having a cross sectional shape that is longer in the depth direction of the groove than it is wide. The gasket has a meandering section meandering in the width direction of the installation groove and also has a rib provided projecting from the inner periphery and/or the outer periphery of the meandering section.

11 Claims, 7 Drawing Sheets

GASKET

CROSS-REFERENCE TO RELATED APPLICATIONS

This application is a National Stage of International Application No. PCT/JP2006/313399, filed Jul. 5, 2006. This application claims the benefit of Japanese Patent Application No. 2005-198669, filed Jul. 7, 2005. The disclosures of the above applications are incorporated herein by reference.

FIELD

The present disclosure relates to a gasket, and more particularly to a gasket used in a resin housing.

BACKGROUND

The statements in this section merely provide background information related to the present disclosure and may not constitute prior art.

In recent years, for the purpose of a space saving, a weight saving or the like, there has been developed a resin formation and a downsizing of an opponent part to which the gasket is attached.

Accordingly, an enlargement of a tolerance of the opponent part is generated by the resin formation, and it is necessary to make a height of the gasket higher to secure a collapsing margin of the gasket. Further, it is impossible to satisfy a desired filling factor by a conventional circular cross section, due to a limit of a groove width of a installation groove on the basis of the downsizing, and it is necessary to make a width of the gasket installed to the installation groove narrow.

Figure 6:
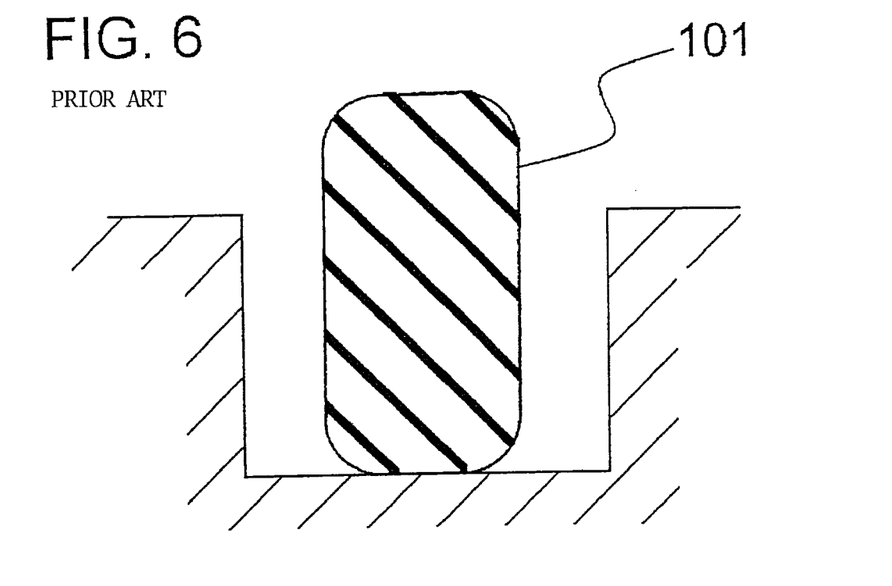
FIG. 6 is a cross sectional view showing a state in which a conventional gasket is installed to a installation groove.

Accordingly, in recent years, as shown in FIG. 6, there is a case where a gasket 101 is supported by being formed in a vertically long cross-sectional shape in which a height is larger than a width (refer to Japanese Utility Model Application Laid-Open No. 6-65662).

Figure 7:
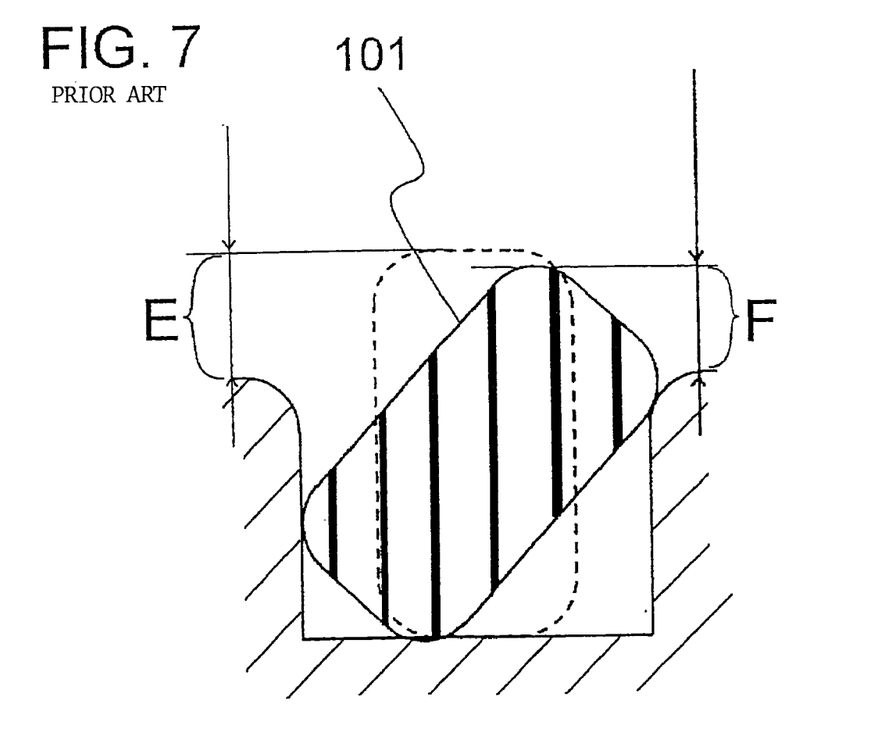
FIG. 7 is a cross sectional view showing a slant state of the conventional gasket.
Figure 8:
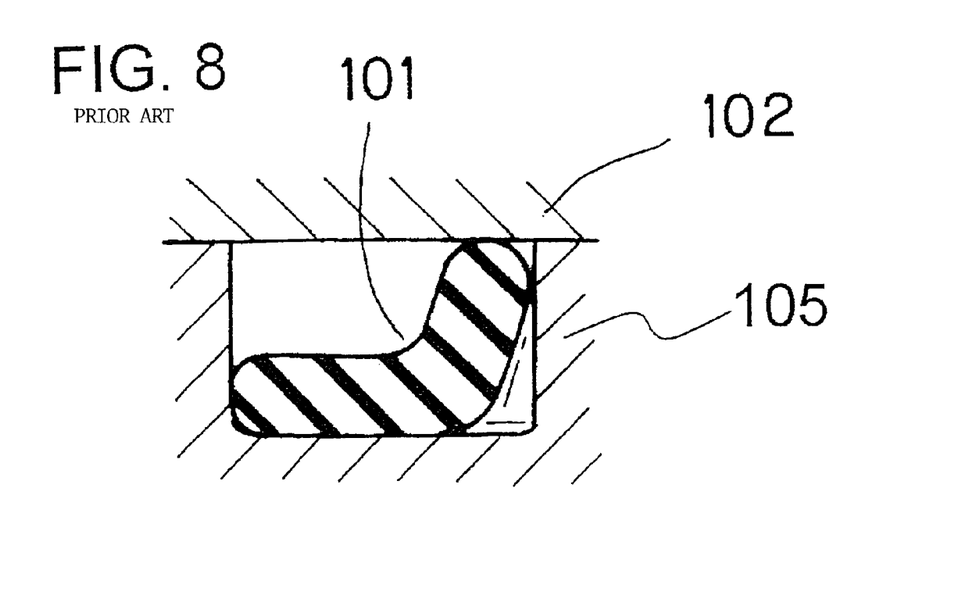
FIG. 8 is a cross sectional view showing a state in which the conventional gasket seals in the slant state.

However, in the gasket 101 having the vertically long cross-sectional shape, since an attitude is unstable and a strength is weak, when an opposite surface 102 is abutted on an opponent member 105, the gasket 101 is collapsed by a smaller collapsing margin F (a collapsing margin in the case that a slant is generated) than a normal collapsing margin E due to a slant (FIG. 7), so that there is a risk that a sealing performance is lowered (FIG. 8).

Figure 9:
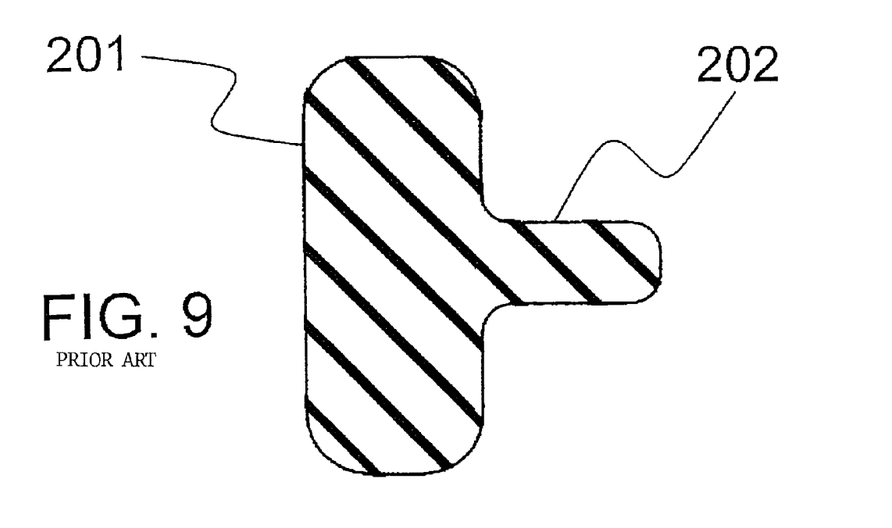
FIG. 9 is a cross sectional view of a conventional gasket provided with a projection.
Figure 10:
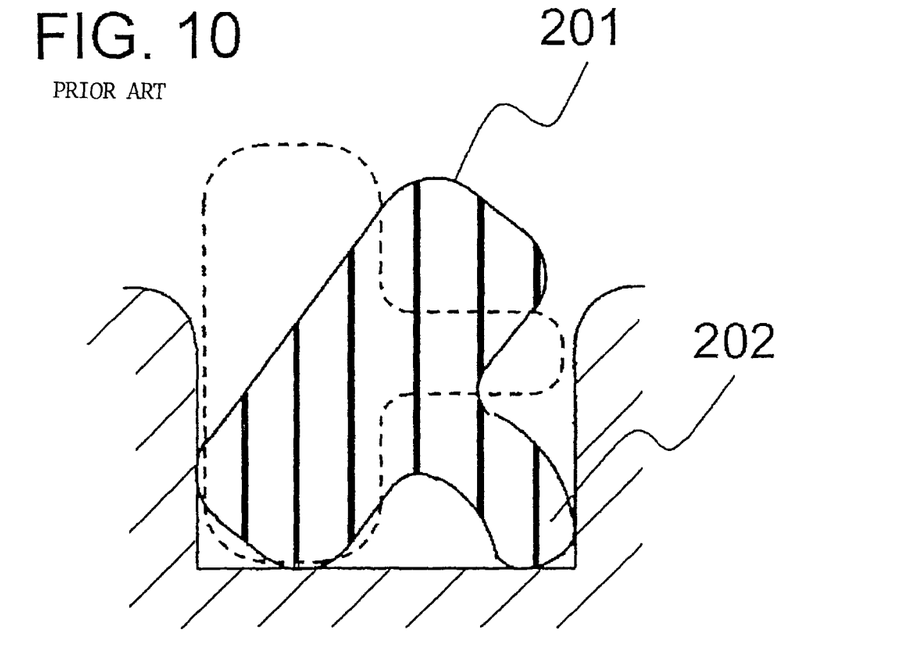
FIG. 10 is a cross sectional view showing a slant state of the conventional gasket provided with the projection.

As a countermeasure thereof, as shown in FIG. 9, projections 202 for preventing the slant may be provided in some positions on an inner periphery or an outer periphery of the gasket 201. However, if the gasket is downsized and a product volume is small, there is after all a risk of the slant (FIG. 10) since a rigidity of the projection is inferior. Further, if the projection volume is set such as to sufficiently support the slant, a filling factor gets over 100%, and there is generated a risk of squeezing out.

Figure 11:
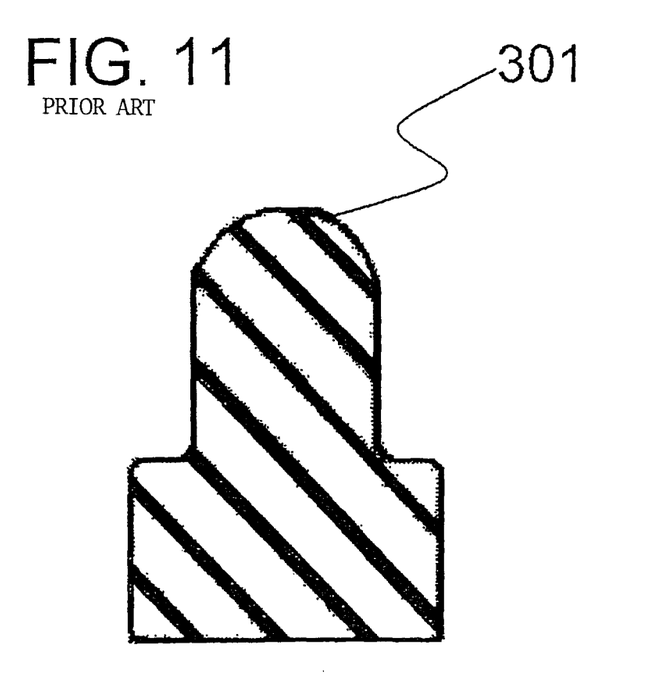
FIG. 11 is a cross sectional view of the conventional gasket.

On the other hand, in order to prevent the slant and a buckling and improve the sealing performance, as shown in FIG. 11, there has been provided a gasket 301 which is formed in a square cross sectional shape, is chamfered in an end portion, and is provided with a protruding portion having a collapsing margin with respect to the other member (refer to the Japanese Utility Model Application Laid-Open No. 6-65662).

Figure 12:
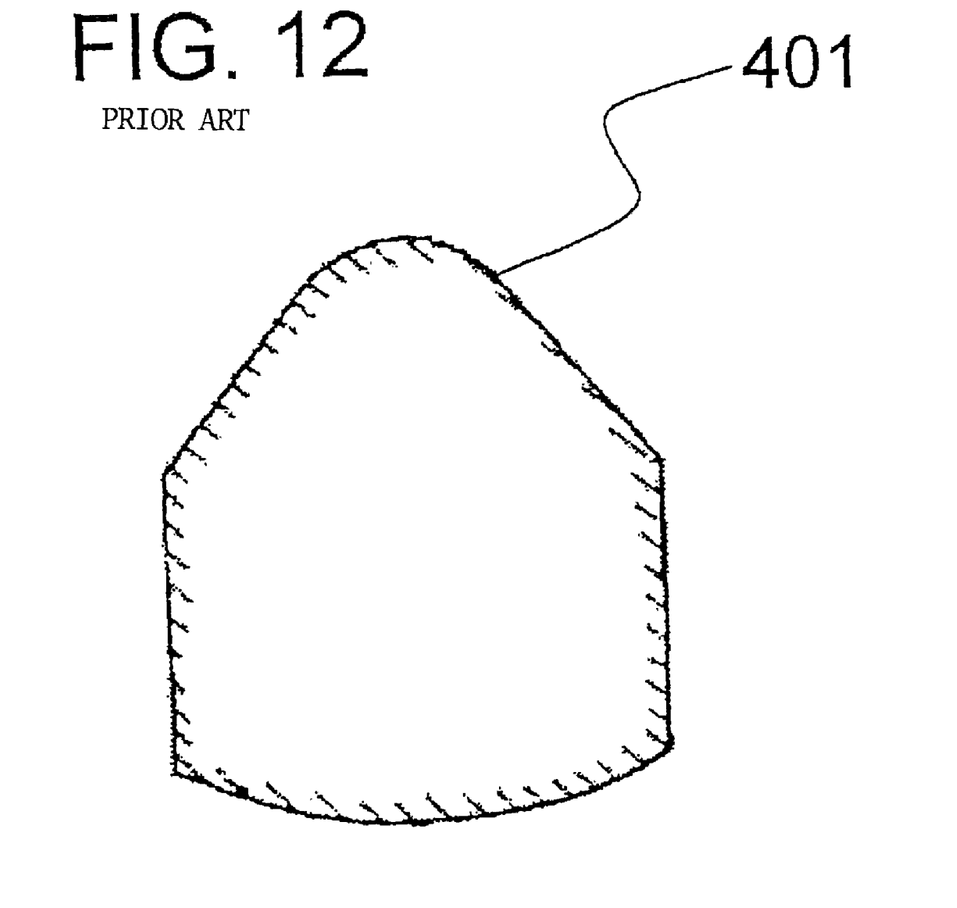
FIG. 12 is a cross sectional view of the conventional gasket.

Further, in order to prevent the slant or the buckling of the gasket, as shown in FIG. 12, there has been provided a structure in which a gasket 401 is formed in a shape having a self-repairing performance (refer to Japanese Patent No. 3346099).

However, since the gaskets 301 and 401 are formed in an asymmetrical shape vertically, there is a problem that it is hard to discriminate vertically and an installing error tends to be generated in the case that the volume is small.

Accordingly, in Japanese Patent Application Laid-Open No. 2005-16621, there is disclosed a technique for preventing the slant and the buckling by a gasket which is formed in a vertically long cross sectional shape in a groove depth direction installed within a installation groove, and meanders in a groove width direction with respect to the linearly extending installation groove.

SUMMARY

The present disclosure provides a gasket that prevents a slant and a buckling of the gasket having a vertically long cross sectional shape.

In order to achieve the object mentioned above, there is provided a gasket installed within a installation groove formed in any one of two opposite surfaces and formed in a vertically long cross sectional shape in a groove depth direction, comprising a meandering portion meandering in a groove width direction with respect to the installation groove; and a rib provided so as to protrude in the groove width direction from an inner periphery and/or an outer periphery of the meandering portion.

In accordance with this structure, in the portion protruding toward a wall surface of the installation groove in the meandering portion, it is possible to suppress a slant to the wall surface side on the basis of a contact of the portion with the wall surface. In addition, in the portion that does not protrude toward the wall surface, rigidity becomes higher on the basis of a provision of the rib, and it is possible to suppress a torsion and the slant.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The best mode for carrying out the present disclosure is given below in an exemplifying manner with reference to the accompanying drawings. In this case, dimensions, materials, shapes relative layouts and the like of constituting parts described may limit the scope of the present disclosure only by describing in a particularly definite manner. Further, the material, the shape and the like of the member that is once described in the following description is the same as the first description unless any special description is given.

Figure 1:
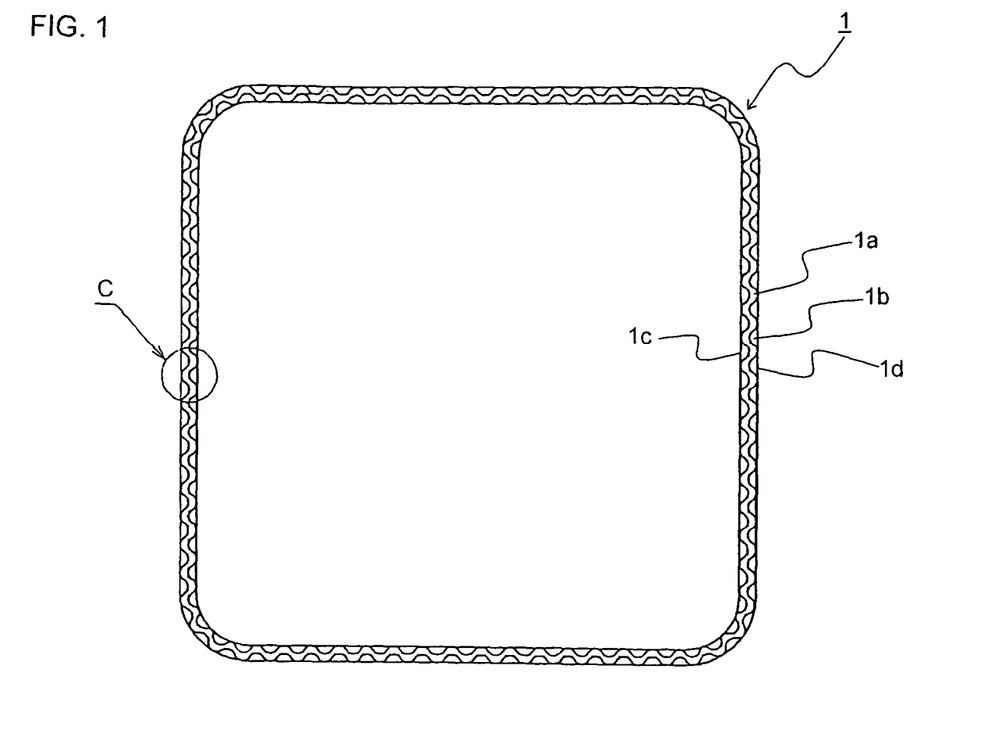
FIG. 1 is a plan view showing a gasket in accordance with an embodiment.
Figure 2A:
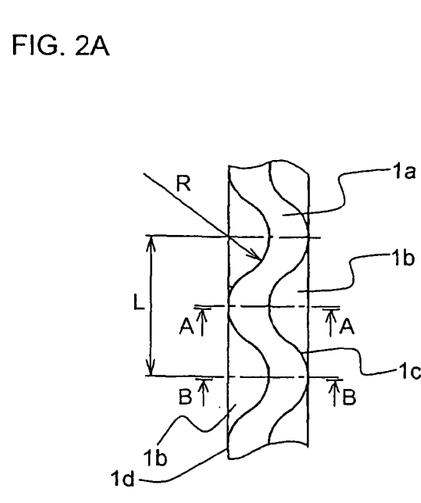
FIG. 2A is a top elevational view enlarging a portion C of the gasket shown in FIG. 1.
Figure 2B:
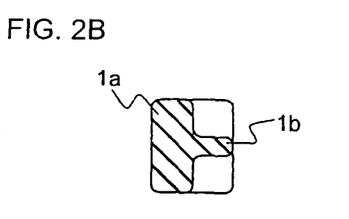
FIG. 2B is a cross sectional view along a line A-A.
Figure 2C:
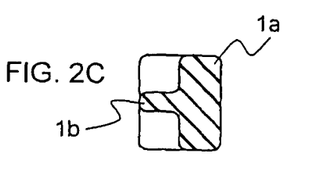
FIG. 2C is a cross sectional view along a line B-B.
Figure 3A:
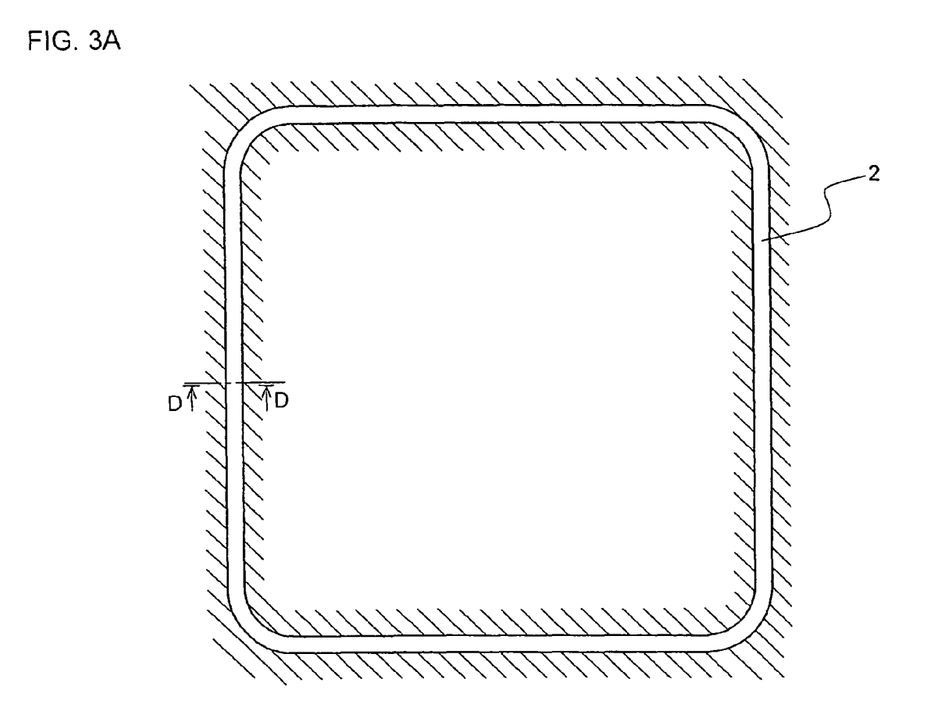
FIG. 3A is a top elevational view of a installation groove to which a gasket in accordance with an embodiment 1 is attached.
Figure 3B:
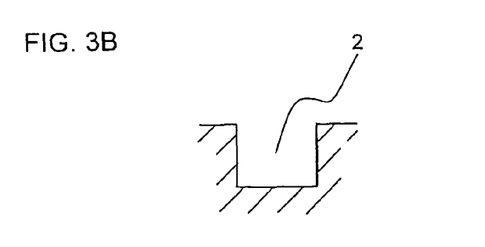
FIG. 3B is a cross sectional view along a line D-D.
Figure 4:
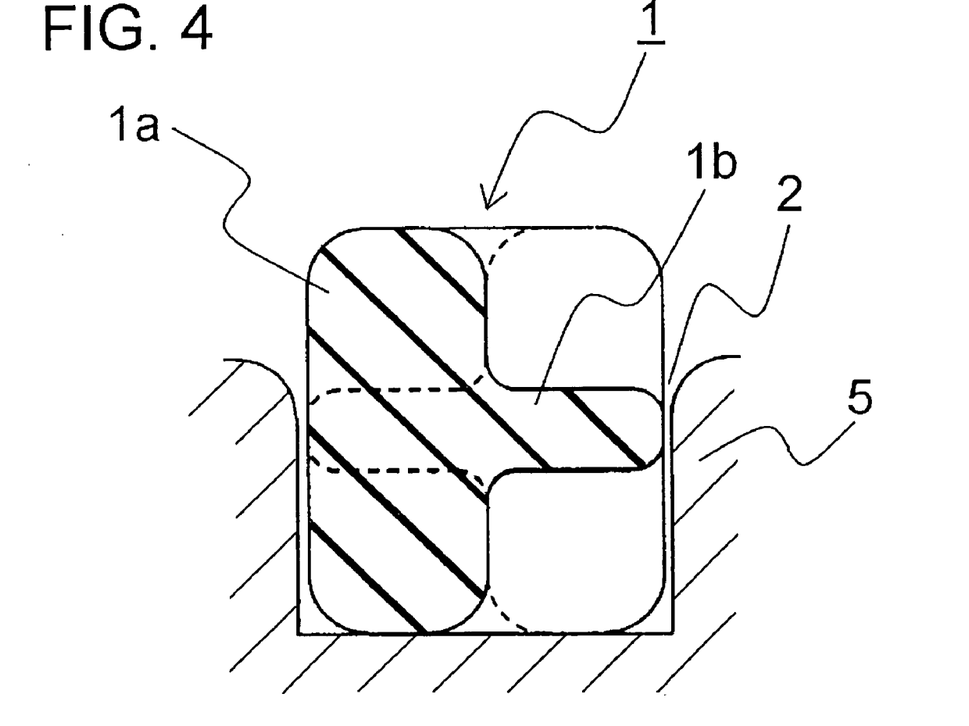
FIG. 4 is a cross sectional view at a time of installing the gasket in accordance with the embodiment to the installation groove.
Figure 5:
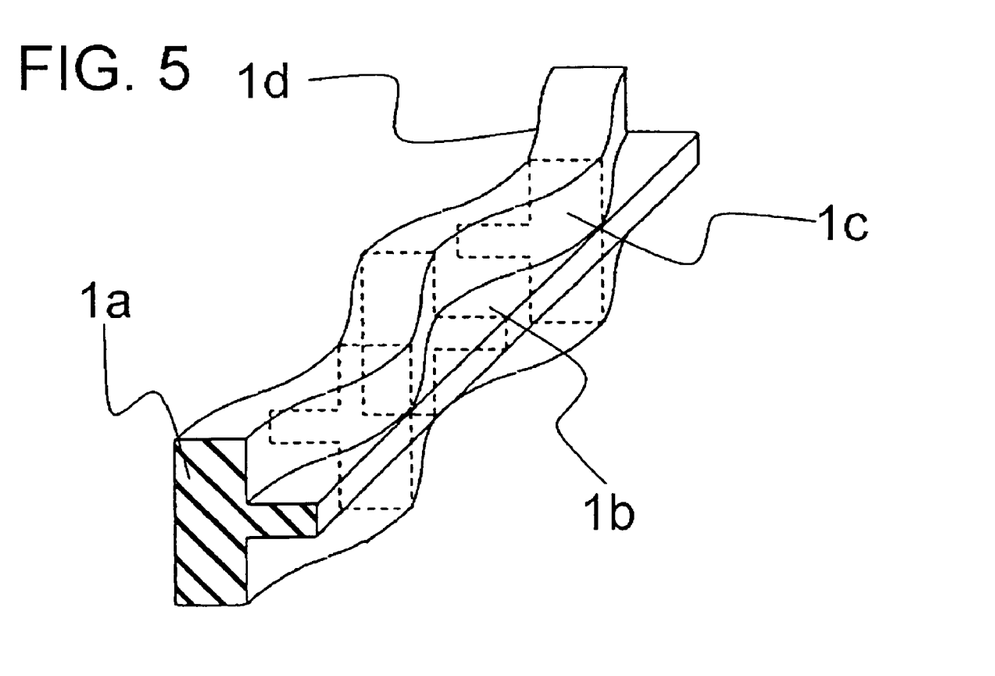
FIG. 5 is a perspective view of a main portion of the gasket in accordance with the embodiment.

With reference to FIGS. 1 to 5, a description will be given of a gasket in accordance with the present disclosure. FIG. 1 is a plan view showing a gasket. FIG. 2A is a top elevational view enlarging a portion C of the gasket shown in FIG. 1, FIG. 2B is a cross sectional view along a line A-A, and FIG. 2C is a cross sectional view along a line B-B. FIG. 3A is a top elevational view of a installation groove to which a gasket is attached, and FIG. 3B is a cross sectional view along a line D-D. FIG. 4 is a cross sectional view at a time of installing the gasket to the installation groove. FIG. 5 is a perspective view of a main portion of the gasket.

A gasket 1 is explained by exemplifying a structure used in a state of arranging two opposite surfaces comprising a surface of a resin housing in which a installation groove 2 as shown in FIG. 3 is formed, and an opposite surface of a member (not shown) opposing to the resin housing surface.

In this case, the resin housing is formed by injection molding, and is not worked thereafter. Accordingly, the installation groove 2 may also be formed at the time of injection molding; however, groove flatness is bad and tolerance is large. Further, a groove width may be limited in accordance with a downsizing requirement in recent years.

The gasket in accordance with the present disclosure may achieve an effect by being used in the two opposite surfaces mentioned above; however, it is not limited to such two opposite surfaces, and may be appropriately used between two opposite surface in accordance with various combinations. Particularly, for example, as a gasket for a resin case of an automotive electronic equipment, the gasket may be used in a case that a installation groove is provided in the resin housing.

Accordingly, as shown in FIG. 4, the gasket 1 installed to the installation groove 2 may be provided with a meandering portion 1a having a vertically long cross sectional shape in which a height is increased to secure a collapsing rate for absorbing a deterioration of the groove flatness and a large tolerance, a width of the gasket 1 is narrowed in correspondence to the groove width limit of the installation groove 2, and the height is larger than the width. Specifically, the gasket is provided with the meandering portion 1a having a chamfered rectangular cross sectional shape in which a long axis is set to a direction (a groove depth direction) sandwiched by a bottom surface of the installation groove 2 provided in an opponent member 5 and an opposite surface opposing to an opponent member 5 (refer to FIGS. 2 and 4).

In this case, a cross section of the rectangular shape of the gasket 1 may be formed in a symmetrical shape on the basis of a center portion in a direction of being sandwiched by the bottom surface of the installation groove 2 and the opposite surface to be reversibly installed. In accordance with the structure mentioned above, it is not necessary to distinguish right and wrong sides of the gasket at a time of installing the gasket 1 to the installation groove 2, and it is possible to improve an efficiency of an installing work.

Further, the gasket 1 may be provided with a rib 1b provided in an inner periphery 1c and an outer periphery 1d, in a center portion in a vertical direction of a vertically long cross section of the meandering portion 1a in such a manner as to alternately protrude in the groove width direction. In more detail, the rib 1b is provided alternately in the inner periphery 1c and the outer periphery 1d of the meandering portion 1a in such a manner that the rib 1b protrudes from the concave portion of the meandering portion 1a in a diametrical direction (the groove width direction of the gasket 1 (refer to FIGS. 2 and 5). In this case, the rib 1b is not necessarily provided in both of the inner periphery 1c and the outer periphery 1d, but may be provided in one of the inner periphery 1c and the outer periphery 1d.

Accordingly, in the portion protruding toward the wall surface of the installation groove 2 in the inner periphery 1c or the outer periphery 1d of the meandering portion 1a, since the portion is brought into contact with the wall surface, it is possible to prevent the slant to the wall surface side. Further, in the portion which does not protrude toward the wall surface of the installation groove 2 in the inner periphery 1c or the outer periphery 1d of the meandering portion 1a, since the corner is continuously provided, rigidity may be increased, and the gasket is hard to be collapsed. In other words, since the gasket 1 is hard to be bent in the width direction and the groove depth direction of the installation groove 2, it is possible to suppress the slant and a torsion. Further, rigidity may be increased by setting the rib 1b, and it is possible to suppress the slant and the torsion of the meandering portion 1a to the concave portion side.

Further, in accordance with the shape of the gasket 1, since it is possible to presume a buckling direction of the gasket 1, it is possible to effectively suppress the generation of the torsion of the gasket 1 at a time of compressing. In other words, in the case of a gasket (a straight type gasket) attached linearly to the installation groove, since a cross-sectional shape of the gasket is axially symmetrical, it is hard to presume which direction of an inner side or an outer side of the gasket the buckling is generated (a buckling direction). Accordingly, in the gasket mentioned above, there has been known the structure that intends to prevent the torsion by setting the projection for preventing the buckling in both side surfaces, however, it is hard to completely prevent the torsion. On the contrary, in the case of the gasket meandering with respect to the installation groove, as disclosed in the Japanese Patent Application Laid-Open No. 2005-16621, the cross sectional shape of the gasket is axially asymmetrical, and the portion in the side protruding toward the side wall surface of the installation groove tends to buckle. Accordingly, in the case of the gasket having the axially asymmetrical cross-sectional shape, it is easy to presume the buckling direction, and it is possible to increase the rigidity of the portion by setting the rib in the portion which does not protrude toward the installation groove as in the present invention to inhibit the buckling from being generated in the portion, whereby it is possible to inhibit the torsion from being generated.

The cross-sectional shape of the gasket 1 may be formed in the chamfered rectangular cross-section shown in FIG. 2. The cross-sectional shape, however, is not particularly limited as far as a vertically long cross-sectional shape sandwiched by the bottom surface of the installation groove 2 and the surface opposite thereof, in addition to an oval cross section. Further, the cross sectional shape may be constituted by a symmetrical shape on the basis of the center portion in a direction of being sandwiched by the bottom surface of the installation groove 2 and the surface opposite thereof in such a manner as to be reversibly installed.

The meandering shape of the gasket 1 may be formed at a time of molding the gasket 1, and the gasket 1 meanders even before being installed to the installation groove 2.

A meandering width at which the gasket 1 meanders is approximately equal to a groove width of the installation groove 2, and the present embodiment is structured such that a groove width MIN (a minimum groove width) is slightly wider than a meandering width MAX (a maximum meandering width). As mentioned above, it is possible to prevent the meandering portion 1a from being interfered with the installation groove 2 by making the meandering width of the gasket 1 slightly narrower than the groove width of the installation groove 2, and it is possible to well install the gasket 1 to the installation groove 2.

In this case, the gasket is not limited to the structure in which the groove width MIN (the minimum groove width) of the installation groove is slightly wider than the meandering width MAX (the maximum meandering width), but may be structured such that the groove width MIN (the minimum groove width) is equal to or slightly narrower than the meandering width MAX (the maximum meandering width). In this case, it is possible to make it hard to prevent the gasket from coming off from the installation groove.

The gasket 1 may be formed in an annular shape as a whole as shown in FIG. 1, and has a sealed space in an inner peripheral side in a used state.

The gasket 1 may be fitted to the installation groove 2 formed in the resin housing, as shown in FIG. 2. Further, at a time of arranging the resin housing surface to which the installation groove 2 of the resin housing is open, and the opposite surface (not shown) opposing thereto in abutting state, the protruding end portion side of the gasket 1 protruding from the installation groove 2 is compressed by the opposite surface of the member opposing to the housing surface so as to seal.

In this case, FIGS. 2B and 2C show cross-sections at different positions of the meandering portion of the gasket 1. FIG. 2B is a cross sectional view at a position along a line A-A in FIG. 2A, and shows a case that a left side surface of the gasket 1 is brought into contact with the installation groove 2, and FIG. 2C is a cross-sectional view at a position along a line B-B in FIG. 2A. In other words, the gasket 1 is structured such that the cross-sectional states of FIGS. 2B and 2C are formed at intervals of a predetermined distance in a circumference direction of the gasket 1, and oppose to the installation groove 2 approximately at a uniform interval one by one alternately with both side surfaces of the gasket 1.

Since the gasket 1 is meandered in the area where in which the installation groove 2 extends linearly, it is possible to arrange the gasket 1 so as to be bent within the linear installation groove 2. Accordingly, compression resistance may be improved, and it is possible to prevent the gasket 1 from falling and buckling.

In the gasket 1, a slant preventing effect is improved by making a pitch (L in FIG. 2A) of the meandering and a magnitude of a round (R in FIG. 2A) smaller. However, if a circumference length of the gasket 1 is increased, a volume filling factor of the gasket 1 into the installation groove 2 is increased, so that it is necessary to set the volume filling factor within 100% at the maximum.

In this case, the meandering of the gasket 1 is formed in such a manner as to draw the circular arc, however, is not limited to this, but may be formed by bending with an angle such as a saw tooth in addition to the bending such as the circular arc. The kind of the meandering is not particularly limited as far as the meandering portion of the gasket 1 is formed so as to be oscillated and wind in a groove width direction of the installation groove 2.

As described above, since the gasket 1 meanders in the groove width direction in the range where the installation groove 2 extends linearly, it is possible to arrange to bend the gasket 1 within the linearly extending installation groove 2, it is possible to improve the compression resistance of the gasket 1, and it is possible to prevent the gasket 1 having the vertically long cross sectional shape from falling over and buckling.

What is claimed is:

1. A gasket for installation in a groove formed in one of two opposing surfaces, the groove having a bottom surface and a pair of side surfaces, the gasket comprising:
    a main body having a first portion that extends in an axial direction away from the bottom surface of the groove and a second portion that extends in the axial direction toward the bottom surface of the groove, said first and second portions including a plurality of contoured surfaces such that said first and second portions meander back and forth between the side surfaces of the groove; and
    a plurality of ribs that bisect said first and second portions, said ribs extending radially toward said pair of side surfaces at positions between each of said plurality of contoured surfaces along said entire length of the main body.

2. The gasket of claim 1, wherein a height of said main body is greater than a depth of the groove.

3. The gasket of claim 1, wherein a height of said main body is greater than a width of the groove.

4. The gasket of claim 1, wherein said contours are round.

5. The gasket of claim 4, wherein said contours are arranged at a predetermined pitch.

6. The gasket of claim 4, wherein said ribs structurally reinforce said main body.

7. A gasket for installation in a groove formed in one of two opposing surfaces, the groove having a bottom surface, a first side surface, and a second side surface, the gasket comprising:
    a gasket body extending axially between the bottom surface and the opposing surface, said gasket body meandering radially back and forth between said first and second side surfaces along an entire length thereof;
    a plurality of ribs extending radially from an inner periphery of said gasket body facing said first side surface and an outer periphery of said gasket body facing said second side surface, said plurality of ribs extending radially from said inner periphery extending toward said first side surface and said plurality of ribs extending radially from said outer periphery extending toward said second side surface, said plurality of ribs extending from said inner periphery and said outer periphery along said entire length of said gasket body.

8. The gasket of claim 7, wherein a height of said main body is greater than a depth of the groove.

9. The gasket of claim 7, wherein a height of said main body is greater than a width of the groove.

10. The gasket of claim 7, wherein said ribs structurally reinforce said gasket body.

11. The gasket of claim 7, wherein said ribs extending from said inner periphery and said ribs extending from said outer periphery alternate along said entire length of said gasket body.

* * * * *